(No Model.)

M. T. DENNE.
CUTTER FOR TRIMMING THE EDGES OF BOOT SOLES.

No. 545,223. Patented Aug. 27, 1895.

Witnesses.
G. F. Redfern
John E. Bousfield.

Inventor.
M. T. Denne

United States Patent Office.

MARK THOMAS DENNE, OF EASTBOURNE, ENGLAND.

CUTTER FOR TRIMMING THE EDGES OF BOOT-SOLES.

SPECIFICATION forming part of Letters Patent No. 545,223, dated August 27, 1895.

Application filed May 21, 1895. Serial No. 550,059. (No model.)

*To all whom it may concern:*

Be it known that I, MARK THOMAS DENNE, a subject of the Queen of Great Britain, residing at Eastbourne, England, have invented new and useful Improvements in Cutters for Trimming the Edges of Boot-Soles and for other Purposes, of which the following is a specification.

My invention relates to cutter-disks of that class in which a series of loose cutters is employed, the object of this invention being to provide means whereby such cutters, especially when the contour of the cutting-edges has to be preserved, may be sharpened more readily then heretofore, and whereby a considerable length of cutter is provided relatively with the diameter of the cutter-disk, thereby permitting of being sharpened many times before renewal is necessary.

Furthermore, by my invention a cutter of a given width may be formed with a relatively small weight of metal, thus enabling it to be readily ground.

According to my invention, each cutter is in the form of a hollow cylinder, which is slotted longitudinally at one point to form a cutting-edge and turned or shaped externally to correspond with the contour which is to be given to the surface operated upon. Each cutter, which is of a diameter less than half the diameter of the cutter-disk, is located in an annular recess near to the periphery of the said disk in such a manner that the cutting-edge may project slightly beyond the periphery of the cutter-disk.

To enable my invention to be fully understood, I will describe the same by reference to the accompanying drawings, in which—

Figure 1:
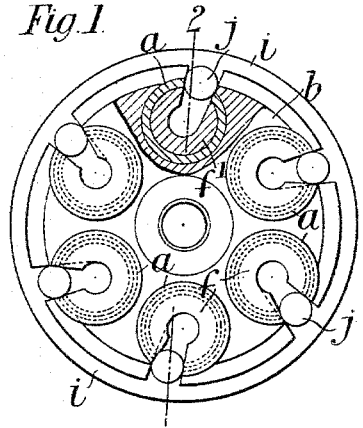
Figure 2:
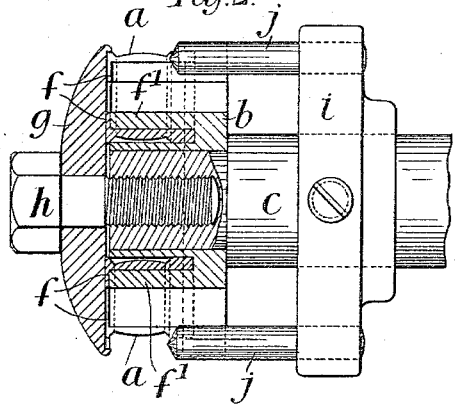
Figure 3:
Figure 4:
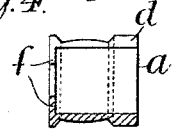
Figure 6:
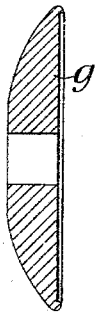
Figure 5:
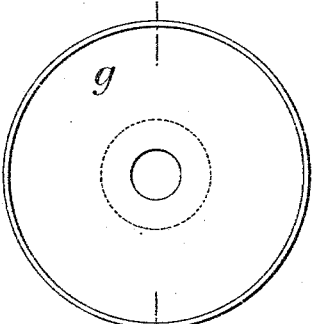
Figure 7:
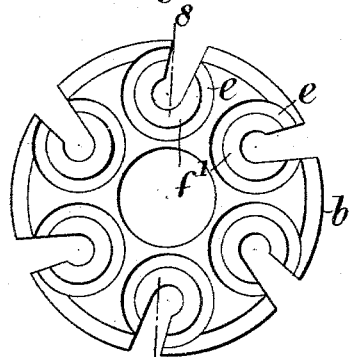
Figure 8:
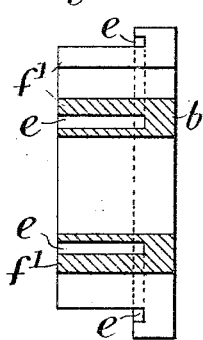

Figure 1 is an elevation, partly in section, of my improved cutter, a disk for clamping the cutters in position being removed; and Fig. 2 is an elevation, partly in section, on the line 2 2, Fig. 1, but showing the disk removed from Fig. 1 in position. Fig. 3 is a front view of one of the cutters detached; and Fig. 4 is a section on the line 4 4, Fig. 3. Fig. 5 is an elevation of the clamping-disk. Fig. 6 is a section of the clamping-disk on the line 6 6, Fig. 5. Fig. 7 is an elevation of the disk or block in which the cutters proper are mounted, and Fig. 8 is a section of the same on the line 8 8, Fig. 7.

$a\ a$ are my improved cutters, and $b$ is the disk or block in which the same are mounted, the said disk or block being adapted to be secured upon a shaft or spindle, such as $c$. The said cutters $a\ a$, which are in the form of hollow cylinders, are each formed with a longitudinal and approximately radial slot $d$, as shown in Figs. 3 and 4, and are located in annular recesses $e\ e$, formed in the block or disk $b$, as shown in Figs. 7 and 8, so that the said cutters will accurately fit into the said annular recesses in a manner which will be readily understood by referring to Figs. 1 and 2, the said recesses being so formed that when the cutters are in position their peripheral surfaces will project slightly above the peripheral surface of the cutter-block $b$.

In order to fix the cutters in position, each of them is represented as being provided with a plate or flange $f$, which when the cutter is in position lies upon or against the end of the stud or projection $f'$, forming the inner wall of the annular recess $e$. The plates or flanges $f$ of the several cutters are held tightly in contact with the flanges or projections $f'\ f'$ by a clamping-plate $g$, (shown detached in Figs. 5 and 6,) pressed against the said cutters by means of a screw $h$, which is represented in the drawings as being introduced into a screw-threaded aperture at the center of the shaft $c$.

In order to facilitate the setting of the cutters and to insure that the cutting-edges shall always project the same distance above the peripheral surface of the block $b$, I fix to the shaft $c$ a plate $i$, having a series of arms $j\ j$, which form bearing-surfaces against which the cutting-edges of the cutters may be adjusted in a manner which will be readily understood by reference to Figs. 1 and 2. These arms $j\ j$, with the plate $i$, also form a kind of carrier or driver for insuring the rotation of the cutter with the shaft $c$.

As shown in the drawings, the cutters are shaped for the purpose of trimming the edges of boot-soles, but it is obvious that they may be made of any other suitable peripheral shape, according to requirements.

It will be readily understood that my improved cutters can be sharpened from time to time by simply grinding the approximately radial faces forming the cutting-edges, and that the cutters may be sharpened as many times as required, provided there is sufficient length of flange left to enable the cutters to be held in position.

Having now particularly described and ascertained the nature of my said invention and in what manner the same is to be performed, I declare that what I claim is—

1. In a rotary cutter the combination with the cutter disk provided with a series of annular recesses forming studs within the same, of a series of cylindrical cutters of a length substantially equal to the depth of said recesses, said cutters having end portions for engaging said studs and securing devices for adjustably clamping said end portions of said cutters in engagement with said studs, substantially as described.

2. In a rotary cutter the combination with the cutter disk provided with a series of annular recesses forming studs within the same, of a series of cylindrical cutters of a length substantially equal to the depth of said recesses, adapted to enter said recesses, and having end portions for engaging said studs, a clamping plate for engaging said end portions of said cutters for clamping them simultaneously in engagement with said studs and means for securing said clamping plate to said disk, substantially as described.

3. In a rotary cutter the combination with the cutter shaft, of the cutter disk provided with a series of annular recesses, a series of cylindrical cutters having radial slots formed therein, and adapted to enter said recesses, means for clamping said cutters in engagement with said disk, and an adjusting plate on said cutter shaft having projections for engaging the slots in said cylindrical cutters, substantially as described.

4. In a rotary cutter the combination of a cutter-disk $b$ having a series of annular recesses formed therein, a series of cylindrical cutters, having radial slots and provided with flanges at one end, inserted into the said recesses, a clamping plate $g$ for securing the said cutters in position in the said annular recesses and a series of adjusting pins such as $j$ fixed to a plate upon the cutter shaft, substantially as described.

MARK THOMAS DENNE.

Witnesses:
G. F. REDFERN,
JOHN E. BOUSFIELD.